(12) United States Patent
Krause et al.

(10) Patent No.: US 7,972,725 B2
(45) Date of Patent: Jul. 5, 2011

(54) POLYIMIDE ELECTRODE BINDERS

(75) Inventors: Larry J. Krause, Stillwater, MN (US); Lowell D. Jensen, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1707 days.

(21) Appl. No.: 11/218,448

(22) Filed: Sep. 1, 2005

(65) Prior Publication Data

US 2006/0099506 A1    May 11, 2006

Related U.S. Application Data (60) Provisional application No. 60/625,931, filed on Nov. 8, 2004.

(51) Int. Cl.
*H01M 4/62* (2006.01)
*H01M 4/58* (2006.01)
*H01M 4/40* (2006.01)

(52) U.S. Cl. ............... 429/217; 429/231.95; 429/231.4; 429/232; 252/182.1

(58) Field of Classification Search ............... 429/217, 429/231.95, 231.4, 231.1, 231.9
See application file for complete search history.

(56) References Cited

U.S. PATENT DOCUMENTS

| | | | |
|---|---|---|---|
| 4,452,938 A * | 6/1984 | Byrne et al. ............. 524/439 |
| 5,401,598 A * | 3/1995 | Miyabayashi et al. ..... 429/231.9 |
| 5,468,571 A | 11/1995 | Fujimoto et al. |
| 5,536,599 A | 7/1996 | Alamgir et al. |
| 5,709,968 A | 1/1998 | Shimizu |
| 5,763,119 A | 6/1998 | Adachi |
| 5,858,573 A | 1/1999 | Abraham et al. |
| 5,882,812 A | 3/1999 | Visco et al. |
| 5,888,672 A | 3/1999 | Gustafson |
| 6,001,507 A | 12/1999 | Ono et al. |
| 6,004,698 A | 12/1999 | Richardson et al. |
| 6,045,952 A | 4/2000 | Kerr et al. |
| 6,203,944 B1 | 3/2001 | Turner et al. |
| 6,255,017 B1 | 7/2001 | Turner |
| 6,387,570 B1 | 5/2002 | Nakamura et al. |
| 6,387,571 B1 | 5/2002 | Lain et al. |
| 6,436,578 B2 | 8/2002 | Turner et al. |
| 6,680,145 B2 | 1/2004 | Obrovac et al. |
| 6,699,336 B2 | 3/2004 | Turner et al. |

(Continued)

FOREIGN PATENT DOCUMENTS

EP    0311374 B1 * 10/1988

(Continued)

OTHER PUBLICATIONS

Eichstadt et al., Journal of Polymer Science: Part B: Polymer Physics, vol. 40, 1503-1512 (2002).

(Continued)

*Primary Examiner* — Dah-Wei Yuan
*Assistant Examiner* — Angela J. Martin
(74) *Attorney, Agent, or Firm* — Stephen F. Wolf (57) ABSTRACT

Irreversible first cycle capacity loss in lithium secondary cells having a cell electrode based on a powdered material and a binder may be significantly decreased or eliminated by using an aliphatic or cycloaliphatic polyimide binder. Compared to conventional polyimide binders prepared by reacting an aromatic dianhydride and a diamine, the disclosed polyimide binders have decreased aromatic carbonyl content, may be less likely to undergo electrochemical reduction, and may be less likely to consume electrons that might otherwise help lithiate the electrode.

22 Claims, 3 Drawing Sheets

U.S. PATENT DOCUMENTS

| | | |
|---|---|---|
| 6,723,432 B2 | 4/2004 | Sugo et al. |
| 6,759,164 B2 | 7/2004 | Palazzo et al. |
| 6,780,544 B2 | 8/2004 | Noh |
| 6,790,561 B2 | 9/2004 | Gan et al. |
| 6,797,019 B2 | 9/2004 | Takeuchi et al. |
| 2003/0049535 A1* | 3/2003 | Ohta et al. .................. 429/231.8 |
| 2003/0148185 A1 | 8/2003 | Kusumoto et al. |
| 2003/0198868 A1 | 10/2003 | Takeuchi et al. |
| 2003/0211390 A1 | 11/2003 | Dahn et al. |
| 2003/0235762 A1 | 12/2003 | Fukui et al. |
| 2004/0058240 A1 | 3/2004 | Christensen |
| 2004/0062991 A1 | 4/2004 | Fukui et al. |
| 2004/0072067 A1 | 4/2004 | Minami et al. |
| 2004/0191602 A1* | 9/2004 | Ishikawa et al. .............. 429/33 |
| 2005/0031957 A1 | 2/2005 | Christensen et al. |
| 2006/0040182 A1* | 2/2006 | Kawakami et al. ......... 429/218.1 |
| 2006/0046144 A1 | 3/2006 | Obrovac |

FOREIGN PATENT DOCUMENTS

| | | |
|---|---|---|
| EP | 0 311 374 | 4/1989 |
| EP | 0 450 549 | 10/1991 |
| EP | 0450549 B1 * | 9/1997 |
| EP | 1246280 A2 * | 3/2002 |
| EP | 1 246 280 | 10/2002 |
| JP | 11-102708 | 4/1999 |
| JP | 11-158277 * | 6/1999 |
| JP | 2004-247233 * | 9/2004 |
| WO | WO 97/45497 | 4/1997 |
| WO | WO 01/29920 | 4/2001 |

OTHER PUBLICATIONS

Fang et al., Polymer, vol. 45, 2539-2549 (2004).

Hiroshi Seino et al., *High Performance Polymers*, vol. 11, 255-262 (1999).

Hiroshi Seino et al., Journal of Polymer Science: Part A: Polymer Chemistry, vol. 37, 3584-3590 (1999).

Jeon et al., Journal of Applied Polymer Science, vol. 60, 1921-1926 (1995).

Krause et al., *Electronic Conduction in Polyimides*, J. E. Electrochem. Soc., vol. 136, No. 5, May 1989.

Loncrini et al., Journal of Polymer Science, Part A-1, vol. 7, 2185-2193 (1969).

Matsumoto, *High Performance Polymers*, vol. 13 (2001).

Schab-Balcerzak et al.,European Polymer Journal, vol. 38, 423-430 (2002).

Wilson et al., *J. Electrochem. Soc.*, 142, 326-332 (1995).

\* cited by examiner

POLYIMIDE ELECTRODE BINDERS

STATEMENT OF PRIORITY

This application claims the priority of U.S. Provisional Application No. 60/625,931 filed Nov. 8, 2004, the contents of which are hereby incorporated by reference.

FIELD OF THE INVENTION

This invention relates to electrode binders for rechargeable lithium-ion cells and to cells containing such electrodes or electrode binders.

BACKGROUND

Powdered alloys of main group elements and conductive powders such as carbon black have been used to make electrodes for lithium ion cells. Electrodes may be fabricated, for example, by mixing the powdered active ingredient with a polymeric binder such as polyvinylidene fluoride. The mixture may be prepared as a dispersion in a solvent for the polymeric binder, and coated onto a metal foil substrate. The resulting composite electrode may contain the powdered active ingredient in the binder, adhered to the metal substrate.

Lithium ion cell electrodes containing polyimide binders have been mentioned in U.S. Pat. Nos. 5,468,571 (Fujimoto et al.), 5,888,672 (Gustafson et al.), 6,001,507 (Ono et al.), 6,723,432 B2 (Sugo et al.), 6,759,164 B2 (Palazzo et al.), 6,790,561 B2 (Gan et al.) and 6,797,019 B2 (Takeuchi et al. '019), U.S. Patent Application Publication Nos. US 2003/0049535 A1 (Ohta et al.), U.S. Pat. No. 6,946,223 (Kusumoto et al.), U.S. Pat. No. 6,797,019 (Takeuchi et al. '868), U.S. Pat. No. 7,141,334 (Fukui et al.), US 2004/0062991 A1 (Fukui et al. '991) and U.S. Pat. No. 7,153,611 (Minami et al.), and Japanese Published Patent Application No. JP 11-102708 (Asahi Glass Co. Ltd.).

SUMMARY OF THE INVENTION

Many conventional polyimides may be prepared via a condensation reaction between an aromatic dianhydride and a diamine in an aprotic polar solvent such as N-methylpyrrolidinone. This reaction leads to the formation of an aromatic polyamic acid, and subsequent chemical or thermal cyclization leads to the polyimide. The resulting polyimides may be used as binders for metal and graphite based lithium-ion cell electrodes, and can exhibit very good cycling properties. However, the first cycle irreversible capacity loss in the resulting cells can be unacceptably large, e.g., as large as 300 mAh/g or more for an electrode based on a powdered metal material. Without intending to be bound by theory, this irreversible capacity loss may be caused by electrochemical reduction of the polyimide, facilitated by the presence of electron-withdrawing carbonyl groups on the polyimide aromatic rings. The electrochemical reduction reaction may consume electrons that might otherwise help lithiate the electrode, and appears to be largely irreversible when using commonly-employed electrode and electrolyte formulations.

This irreversible first cycle capacity loss may be significantly decreased or eliminated by forming the electrode using an aliphatic or cycloaliphatic polyimide binder. Such a polyimide binder (which may be prepared by reacting an aliphatic or cycloaliphatic dianhydride and a diamine) has decreased aromatic carbonyl content compared to binders made from conventional polyimides (which typically are prepared by reacting an aromatic dianhydride and a diamine). The disclosed aliphatic or cycloaliphatic polyimide binders may be used to prepare electrodes and cells that experience decreased first cycle irreversible capacity loss compared to electrodes and cells made with conventional aromatic polyimides.

The invention provides, in one aspect, a secondary battery electrode composition comprising a powdered material capable of undergoing lithiation and delithiation and an aliphatic or cycloaliphatic polyimide binder. The polyimide binder comprises repeating units having the formula:

where:
  $R_1$ is aliphatic or cycloaliphatic and
  $R_2$ is aromatic, aliphatic, cycloaliphatic or a combination thereof.

The invention provides, in another aspect, a rechargeable lithium-ion cell comprising a negative electrode comprising a powdered material capable of undergoing lithiation and delithiation and an aliphatic or cycloaliphatic polyimide binder, a positive electrode, and an electrolyte comprising a lithium salt and a charge carrying medium.

The disclosed polyimide binders can improve cycle life in rechargeable lithium ion cells employing electrodes based on small particle alloy powders. The disclosed polyimides may also allow fabrication of rechargeable lithium ion cells having improved capacities or employing novel or not previously employed alloy powders. The rechargeable lithium ion cells can be used, for example, in various electronic devices or in battery packs.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various drawings indicate like elements. The elements in the drawing are not to scale.

DETAILED DESCRIPTION

The words "a", "an", and "the" are used interchangeably with "at least one" to mean one or more of the elements being described.

The word "metal" refers to both metals and to metalloids such as silicon and germanium, whether in an elemental or ionic state.

The word "alloy" refers to a mixture of two or more metals.

The words "lithiate" and "lithiation" refer to a process for adding lithium to an electrode by reduction of lithium ions.

The words "delithiate" and "delithiation" refer to a process for removing lithium from an electrode by oxidation of lithium ions.

The words "charge" and "charging" refer to a process for providing electrochemical energy to a cell.

The words "discharge" and "discharging" refer to a process for removing electrochemical energy from a cell, e.g., when using the cell to do perform desired work.

The phrase "positive electrode" refers to an electrode (often called a cathode) where electrochemical reduction and lithiation occurs during a discharging process.

The phrase "negative electrode" refers to an electrode (often called an anode) where electrochemical oxidation and delithiation occurs during a discharging process.

Unless the context clearly requires otherwise, the words "aliphatic", "cycloaliphatic" and "aromatic" include substituted and unsubstituted moieties containing only carbon and hydrogen, moieties that contain carbon, hydrogen and other atoms (e.g., nitrogen or oxygen ring atoms), and moieties that are substituted with atoms or groups that may contain carbon, hydrogen or other atoms (e.g., halogen atoms, alkyl groups, ester groups, ether groups, amide groups, hydroxyl groups or amine groups).

The phrase "aliphatic or cycloaliphatic polyimide binder" refers to a polyimide that may be derived from an aliphatic or cycloaliphatic polyanhydride.

The disclosed electrode compositions may be used in negative or positive electrodes. A variety of powdered materials may be employed to make the disclosed electrode compositions. Exemplary powdered materials may for example contain silicon, silver, lithium, tin, bismuth, lead, antimony, germanium, zinc, gold, platinum, palladium, arsenic, aluminum, gallium, indium, thallium, alloys containing any of the foregoing metals or metalloids and other powdered active metals and metalloids that will be familiar to those skilled in the art. Exemplary powders may have a maximum dimension that is no greater than 60 micrometers, no greater than 40 micrometers, or no greater than 20 micrometers. The powders may for example have a maximum particle diameter that is submicron, at least 1 micrometer, at least 2 micrometers, at least 5 micrometers, or at least 10 micrometers. For example, suitable powders often have a maximum dimension of 1 to 60 micrometers, 10 to 60 micrometers, 20 to 60 micrometers, 40 to 60 micrometers, 1 to 40 micrometers, 2 to 40 micrometers, 10 to 40 micrometers, 5 to 20 micrometers, or 10 to 20 micrometers. The powdered materials may contain optional matrix formers within powder particles. Each phase originally present in the particle (i.e., before a first lithiation) may be in contact with the other phases in the particle. For example, in particles based on a silicon:copper:silver alloy, a silicon phase may be in contact with both a copper silicide phase and a silver or silver alloy phase. Each phase in a particle may for example have a grain size less than 500 Angstroms, less than 400 Angstroms, less than 300 Angstroms, less than 200 Angstroms, or less than 150 Angstroms.

One exemplary silicon-containing powdered material is the silicon alloy $Si_{57}Al_{28}Fe_{15}$. Other exemplary powdered materials include lithium intercalation compounds such as $Li_{4/3}Ti_{5/3}O_4$; the lithium alloy compositions described in U.S. Pat. Nos. 6,203,944 (Turner '944), 6,255,017 B1 (Turner '017), 6,436,578 B2 (Turner et al. '578), 6,680,145 B2 (Obrovac et al.) and 6,699,336 B2 (Turner et al. '336), U.S. Patent Application Publication 2003/0211390 A1 (Dahn et al.), U.S. Pat. No. 7,498,100 (Christensen et al.) (the disclosure of which is incorporated herein by reference) and U.S. Patent Publication 2006/028583 (Obrovac) (the disclosure of which is incorporated herein by reference); graphitic carbons, e.g., those having a spacing between (002) crystallographic planes, $d_{002}$, of 3.45 ∪>$d_{002}$>3.354 Å and existing in forms such as powders, flakes, fibers or spheres (e.g., mesocarbon microbeads); combinations thereof and other powdered materials that will be familiar to those skilled in the art. Some powdered alloy particles may include a conductive coating. For example, a particle that contains silicon, copper, and silver or a silver alloy may be coated with a layer of conducting material (e.g., with the alloy composition in the particle core and the conductive material in the particle shell). Suitable conductive materials include, for example, carbon, copper, silver, or nickel.

Exemplary powdered alloy materials may be prepared, for example, using a melt spinning process. Such processes are described generally, for example, in *Amorphous Metallic Alloys*, F. E. Luborsky, ed., Chapter 2, Butterworth & Co., Ltd. (1983). According to this process, ingots containing the alloy composition can be melted in a radio frequency field and then ejected through a nozzle onto a surface of a rotating wheel (e.g., a copper wheel). Because the surface temperature of the rotating wheel is substantially lower than the temperature of the melt, contact with the surface of the rotating wheel quenches the melt. Quenching minimizes the formation of large crystallites that can be detrimental to electrode performance. When conductive coatings are employed, they may be formed using techniques such as electroplating, chemical vapor deposition, vacuum evaporation or sputtering.

A variety of aliphatic or cycloaliphatic polyimides may be employed as binders in the disclosed electrode compositions. The polyimide may have a plurality or even a majority of imide groups bonded to aliphatic or cycloaliphatic moieties. The polyimide may also include imide groups bonded to aromatic moieties. The aliphatic or cycloaliphatic polyimide binders comprises repeating units having the formula:

where:
   $R_1$ is aliphatic or cycloaliphatic and
   $R_2$ is aromatic, aliphatic, cycloaliphatic, or a combination thereof.

The $R_1$ and $R_2$ moieties in Formula I may if desired be further substituted with groups that do not interfere with the use of the polyimide binder in a lithium ion cell. For example, when substituents are present on $R_1$, the substituents preferably are electron-donating rather than electron-withdrawing groups. Preferably the polyimide is capable of electrochemical charge transport when evaluated as described in L. J. Krause, P. S. Lugg, and T. A. Speckhard, *Electronic Conduction in Polyimides*, J. E. Electrochem. Soc., Vol. 136, No. 5, May 1989. Preferably the polyimide also can not be electrochemically reduced within the electrochemical window and temperature range (e.g. from about −30° C. to about 70° C.) within which the cell electrodes may operate.

The disclosed aliphatic or cycloaliphatic polyimide binders may be formed, for example, via a condensation reaction between an aliphatic or cycloaliphatic polyanhydride (e.g., a dianhydride) and an aromatic, aliphatic or cycloaliphatic polyamine (e.g., a diamine or triamine) to form a polyamic acid, followed by chemical or thermal cyclization to form the polyimide. The disclosed polyimide binders may also be formed using reaction mixtures additionally containing aromatic polyanhydrides (e.g., aromatic dianhydrides), or from reaction mixtures containing copolymers derived from aromatic polyanhydrides (e.g., aromatic dianhydrides) and aliphatic or cycloaliphatic polyanhydrides (e.g., aliphatic or cycloaliphatic dianhydrides). For example, about 5 to about 95 mole percent of the imide groups in the polyimide may be bonded to aliphatic or cycloaliphatic moieties and about 95 to about 5 mole percent of the imide groups may be bonded to aromatic moieties. As a further example, about 10 to about 90 mole percent of the imide groups may be bonded to aliphatic or cycloaliphatic moieties and about 90 to about 10 mole percent of the imide groups may be bonded to aromatic moieties. As still further examples, about 20 to about 80 mole percent of the imide groups may be bonded to aliphatic or cycloaliphatic moieties and about 80 to about 20 mole percent of the imide groups may be bonded to aromatic moieties, or about 40 to about 60 mole percent of the imide groups may be bonded to aliphatic or cycloaliphatic moieties and about 60 to about 40 mole percent of the imide groups may be bonded to aromatic moieties. Representative aromatic polyanhydrides are described, for example, in U.S. Pat. No. 5,504,128 (Mizutani et al.).

Representative $R_1$ moieties include radicals derivable by removing the carboxylic acid anhydride groups from tetracarboxylic acid dianhydrides such as meso-1,2,3,4-butanetetracarboxylic dianhydride, dl-1,2,3,4-butanetetracarboxylic dianhydride, cyclobutane tetracarboxylic dianhydride, 1,2,3,4-cyclopentane tetracarboxylic dianhydride, cyclohexane tetracarboxylic dianhydride, bicyclo[2.2.2]octane-2,3,5,6-tetracarboxylic 2,3:5,6-dianhydride, bicyclo[2.2.2]oct-7-ene-2,3,5,6-tetracarboxylic dianhydride, bicyclo[2.2.1]-heptane-2,3,5,6-tetracarboxylic 2,3:5,6-dianhydride, (4arH, 8acH)-decahydro-1,t, 4t:5c, 4-cyclohexene-1,1,2,2-tetracarboxylic 1,2:1,2-dianhydride, 4,5-dimethyl-(8CI), bicyclo[2.2.1]heptane-2-exo-3-exo-5-exo-tricarboxyl-5-endo-acetic dianhydride, bicyclo[4.2.0]oxetane-1,6,7,8-tetracarboxylic acid intramolecular dianhydride (6CI), combinations thereof and other polyanhydrides that will be familiar to those skilled in the art. Expressed somewhat differently, representative $R_1$ moieties include tetrafunctional radicals derivable from materials including butane, cyclobutane, cyclopentane, cyclohexane, cyclohexene, bicyclooctane, bicyclooctene, bicycloheptane, bicyclooxetane and other materials that will be familiar to those skilled in the art.

Representative $R_2$ moieties include radicals derivable from polyamines such as diamines and triamines. These include diamines such as 4,4'-oxydianiline, m-phenylenediamine, p-phenylenediamine, benzidene, 3,5-diaminobenzoic acid, o-dianisidine, 4,4'-diaminodiphenyl methane, 4,4'-methylenebis(2,6-dimethylaniline), 1,4-diaminobutane, 1,6-diaminohexane, 1,7-diaminoheptane, 1,9-diaminononane, 1,10-diaminodecane, 1,12-diaminododecane, 5-amino-1,3,3-trimethylcyclohexanemethylamine, 2,5-bis(aminomethyl)bicyclo[2.2.1]heptane, 2,6-bis(aminomethyl)bicyclo[2.2.1]heptane, 2,4-diaminotoluene, 1,4-diamino-2-methoxybenzene, 1,4-diamino-2-phenylbenzene and 1,3-diamino-4-chlorobenzene, 4,4'-diaminobiphenyl, 2,2-bis(4-aminophenyl)propane, 2,2-bis(4-aminophenyl)-1,1,1,3,3,3-hexafluoropropane, 4,4'-diaminodiphenyl ether, 3,4-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, and 3,3'-diaminobenzophenone; and naphthalene diamines such as 1,8- and 1,5-diaminonaphthalene. Other useful polyamines include polycyclic triamines such as naphthalene triamines; heterocyclic aromatic diamines such as 2,6-diaminopyridine, 2,4-diaminopyrimidine, and 2,4-diamino-s-triazine; 1,8-diamino-4-(aminomethyl)octane, combinations of the above-mentioned polyamines and other polyamines that will be familiar to those skilled in the art. Expressed somewhat differently, representative $R_2$ moieties include polyfunctional radicals derivable from materials including benzene, dibenzene, diphenyl ether, diphenylmethane, diphenylpropane, naphthalene, pyridine, pyrimidine, triazine, propane, butane, heptane, hexane, cyclohexane, heptane, octane, nonane, decane, dodecane and other materials that will be familiar to those skilled in the art. Polyoxyethylated polyamines (such as those available from Huntsman Petrochemical Corporation, Houston, Tex. under the tradename JEFFAMINE) may also be useful for forming the disclosed polyimides.

Exemplary polyimides are also described in D. F. Loncrini and J. M. Witzel, *Polyaryleneimides of meso-and dl-1,2,3,4-Butanetetracarboxylic Acid Dianhydrides*, Journal of Polymer Science, Part A-1, Vol. 7, 2185-2193 (1969); Jong-Young Jeon and Tae-Moon Tak, *Synthesis of Aliphatic-Aromatic Polyimides by Two-Step Polymerization of Aliphatic Dianhydride and Aromatic Diamine*, Journal of Applied Polymer Science, Vol. 60, 1921-1926 (1995); Hiroshi Seino et al., *Synthesis of Aliphatic Polyimides Containing Adamantyl Units*, Journal of Polymer Science: Part A: Polymer Chemistry, Vol. 37, 3584-3590 (1999); Hiroshi Seino et al., *High Performance Polymers*, Vol. 11, 255-262 (1999), T. Matsumoto, *High Performance Polymers*, Vol. 13 (2001), E. Schab-Balcerzak et al., *Synthesis and characterization of organosoluble aliphatic-aromatic copolyimides based on cycloaliphatic dianhydride*, European Polymer Journal, Vol. 38, 423-430 (2002); Amy E. Eichstadt et al., *Structure-Property Relationships for a Series of Amorphous Partially Aliphatic Polyimides*, Journal of Polymer Science: Part B: Polymer Physics, Vol. 40, 1503-1512 (2002) and Xingzhong Fang et al., *Synthesis and properties of polyimides derived from cis-and trans-1,2,3,4-cyclohexanetetracarboxylic dianhydrides*, Polymer, Vol. 45, 2539-2549 (2004).

The disclosed aliphatic or cycloaliphatic polyimide binders may provide important advantages over other binders such as fluorochemical elastomers or semi-crystalline materials, including high adhesion to metals (e.g. metal substrates) and metal alloys (e.g., powdered alloys). The disclosed aliphatic or cycloaliphatic polyimide binders may also offer especially good performance with smaller size powdered alloy particles despite the volumetric changes such alloy particles may experience during cell cycling.

The electrode composition may contain additives such as will be familiar to those skilled in the art. For example, the electrode composition may include an electrically conductive diluent to facilitate electron transfer from the powdered material to a current collector. Exemplary electrically conductive diluents include, but are not limited to, carbon (e.g., carbon black for negative electrodes and carbon black, flake graphite and the like for positive electrodes), metal, metal nitrides, metal carbides, metal silicides, and metal borides. For example, representative electrically conductive carbon diluents include carbon blacks such as SUPER P™ and SUPER S™ carbon blacks (both commercially available from MMM Carbon, Belgium), SHAWANIGAN BLACK™ (commercially available from Chevron Chemical Co., Houston, Tex.), acetylene black, furnace black, lamp black, graphite, carbon fibers and combinations thereof. The electrode composition may include an adhesion promoter that promotes adhesion of the powdered material or electrically conductive diluent to the polyimide binder. The combination of an adhesion promoter and an aliphatic or cycloaliphatic polyimide binder may help the binder better accommodate volume changes that may occur in the powdered material during repeated lithiation/delithiation cycles. The disclosed aliphatic or cycloaliphatic polyimide binders may however offer sufficiently good adhesion to metals and alloys so that addition of an adhesion promoter may not provide an appreciable advantage. If used, an adhesion promoter may be made a part of the polyimide binder (e.g., in the form of an added functional group), may be a coating on the powdered material, may be added to the electrically conductive diluent, or may be a combination of such measures. Examples of adhesion promoters include, but are not limited to, silanes, titanates, and phosphonates as described in U.S. Pat. No. 7,341,804 (Christensen), the disclosure of which is incorporated herein by reference.

A variety of electrolytes may be employed in the disclosed lithium ion cell. Representative electrolytes contain one or more lithium salts and a charge carrying medium in the form of a solid, liquid or gel. Exemplary lithium salts are stable in the electrochemical window and temperature range (e.g. from about −30° C. to about 70° C.) within which the cell electrodes may operate, are soluble in the chosen charge-carrying media, and perform well in the chosen lithium-ion cell. Exemplary lithium salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, combinations thereof and other lithium salts that will be familiar to those skilled in the art. Exemplary charge carrying media are stable without freezing or boiling in the electrochemical window and temperature range within which the cell electrodes may operate, are capable of solubilizing sufficient quantities of the lithium salt so that a suitable quantity of charge can be transported from the positive electrode to the negative electrode, and perform well in the chosen lithium-ion cell. Exemplary solid charge carrying media include polymeric media such as polyethylene oxide, polytetrafluoroethylene, polyvinylidene fluoride, fluorine-containing copolymers, polyacrylonitrile, combinations thereof and other solid media that will be familiar to those skilled in the art. Exemplary liquid charge carrying media include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, γ-butylrolactone, methyl difluoroacetate, ethyl difluoroacetate, dimethoxyethane, diglyme (bis(2-methoxyethyl) ether), tetrahydrofuran, dioxolane, combinations thereof and other media that will be familiar to those skilled in the art. Exemplary charge carrying media gels include those described in U.S. Pat. Nos. 6,387,570 (Nakamura et al.) and 6,780,544 (Noh). The charge carrying media solubilizing power may be improved through addition of a suitable cosolvent. Exemplary cosolvents include aromatic materials compatible with Li-ion cells containing the chosen electrolyte. Representative cosolvents include toluene, sulfolane, dimethoxyethane, combinations thereof and other cosolvents that will be familiar to those skilled in the art. The electrolyte may include other additives that will familiar to those skilled in the art. For example, the electrolyte may contain a redox chemical shuttle such as those described in U.S. Pat. Nos. 5,709,968 (Shimizu), 5,763,119 (Adachi), 5,536,599 (Alamgir et al.), 5,858,573 (Abraham et al.), 5,882,812 (Visco et al.), 6,004,698 (Richardson et al. '698), 6,045,952 (Kerr et al.), and 6,387,571 B1 (Lain et al.); in U.S. Patent Publication 2005/0221196 (Dahn et al.) (the disclosure of which is incorporated herein by reference) and in PCT Published Patent Application No. WO 01/29920 A1 (Richardson et al. '920).

The disclosed cells may be used in a variety of devices, including portable computers, tablet displays, personal digital assistants, mobile telephones, motorized devices (e.g, personal or household appliances and vehicles), instruments, illumination devices (e.g., flashlights) and heating devices. Multiple cells can be combined to provide battery packs. Further details regarding the construction and use of rechargeable lithium-ion cells and battery packs will be familiar to those skilled in the art.

The invention is further illustrated in the following illustrative examples, in which all parts and percentages are by mole unless otherwise indicated.

Preparatory Example 1

Preparation of Aliphatic Polyimide Precursor BuTDA-ODA from 1,2,3,4-butanetetracarboxylic Dianhydride and 4,4'-oxydianiline 3 Grams (0.015 moles) 4,4'-oxydianiline were added to 33.8 grams NMP in a round-bottomed vessel. 2.97 Grams (0.015 moles) 1,2,3,4-butanetetracarboxylic dianhydride ("BuTDA", prepared from 1,2,3,4-butanetetracarboxylic acid by refluxing in acetic anhydride) were added to the reaction mixture. The solution was allowed to stir under dry nitrogen overnight to form a 20 wt. % aliphatic polyimide precursor solution.

Preparatory Examples 2-6

Preparation of Aromatic/Aliphatic Polyimide Copolymer Precursors BTDA/BuTDA-ODA from Mixtures of 3,3'4,4'-benzophenonetetracarboxylic Dianhydride, 1,2,3,4-butane-tetracarboxylic Dianhydride and 4,4'-oxydianiline Using the method of Preparatory Example 1, some of the BuTDA was replaced with 3,3',4,4'-benzophenonetetracarboxylic dianhydride ("BTDA", available from Aldrich Chemicals, Milwaukee, Wis.) to form mixed aromatic/aliphatic polyimide copolymer precursor solutions based on BTDA/BuTDA mixtures as shown below in Table I:

TABLE I

| Preparatory Example No. | BTDA, Grams | BuTDA, Grams | ODA, Grams | BTDA:BuTDA Molar Ratio |
| --- | --- | --- | --- | --- |
| Preparatory Example 2 | 0.742 | 3.62 | 3 | 25:75 |
| Preparatory Example 3 | 1.485 | 2.415 | 3 | 50:50 |
| Preparatory Example 4 | 2.28 | 1.21 | 3 | 75:25 |
| Preparatory Example 5 | 2.67 | 0.483 | 3 | 90:10 |
| Preparatory Example 6 | 2.82 | 0.241 | 3 | 95:5 |

Comparative Preparatory Example 1

Preparation of Aromatic Polyimide Precursor BTDA-ODA from 3,3',4,4'-benzophenonetetracarboxylic Dianhydride and 4,4'-oxydianiline 3 Grams (0.015 moles) 4,4'-oxydianiline ("ODA", available from Aldrich Chemicals, Milwaukee, Wis.) were added to 33.8 grams N-methylpyrrolidinone ("NMP", freshly distilled from $CaH_2$) in a round-bottomed vessel. 4.83 Grams BTDA were added to the reaction mixture. The solution was allowed to stir under dry nitrogen overnight to form an aromatic polyimide precursor solution.

Preparatory Example 7

Preparation of $Si_{57}Al_{28}Fe_{15}$ Alloy

A negative electrode powdered alloy material was prepared as described in the above-mentioned U.S. Pat. No. 7,498,100 (Christensen et al.). 6.12 Grams aluminum shot, 12.54 grams silicon flakes, and 6.56 grams iron flakes (all 99.9% or better purity) were weighed and placed in an arc furnace. The mixture was melted in an Ar atmosphere in the presence of a Ti pool oxygen getter to yield 25 grams of an ingot having the composition $Si_{57}Al_{28}Fe_{15}$, where all amounts are in atomic percent.

The ingot was broken into pieces less than 15 mm in diameter. 10 Grams of the pieces were placed inside a quartz tube ending in a 0.89 μm diameter nozzle. A thin carbon sleeve was also inserted in the tube as a radio frequency coupler to initiate melting of the ingot. The tube was placed in the chamber of a melt spinner above a 200 mm diameter copper wheel such that the distance from the nozzle orifice to the wheel surface was 10 mm. The chamber was evacuated to 80 millitorr and backfilled with He to 200 Torr. The ingot was melted in a radio frequency field. When the melt had reached 1150° C., the molten liquid was ejected at 80 Torr He overpressure onto the copper wheel while the wheel rotated at a 35 m/sec surface speed. This quenched the melt and formed approximately 9 grams of ribbon fragments.

Examples 8-12 and Comparative Example 2

Preparation of Negative Electrodes Containing Powdered $Si_{57}Al_{28}Fe_{15}$ Alloy and Polyimide Binders A powdered alloy electrode composition was prepared by combining, in a PULVERISETTE 7™ planetary micro mill (available from Fritsch GmbH) equipped with a 40 ml tungsten carbide vessel, 1.7 grams of the Preparatory Example 7 $Si_{57}Al_{28}Fe_{15}$ alloy, 0.1 grams SUPER P™ carbon powder (available from MMM Carbon, Belgium), 1.33 grams of the Preparatory Example 1 aliphatic polyimide precursor solution, and an additional 2.5 grams NMP. Two 14.25 mm diameter and ten 6 mm diameter tungsten carbide balls were added to the vessel for milling purposes. The vessel and its contents were milled for one hour. The resulting slurry was cast onto a nickel foil using a 0.125 mm notch bar coater. The coating was dried at 80° C. for 30 minutes in air and then placed in an air oven at 150° C. The oven temperature was ramped up to 250° C. and held for one hour, yielding a finished negative electrode with an aliphatic polyimide binder. This electrode was used to form a lithium coin cell identified as Example 8, as further described below. Using a similar procedure, the Preparatory Example 1 aliphatic polyimide precursor solution was replaced with 1.33 grams of the Preparatory Example 3 through Preparatory Example 6 aromatic/aliphatic polyimide precursor solutions to form negative electrodes containing aromatic/aliphatic polyimide binders, and used to form lithium coin cells identified as Examples 9-12. Using a similar procedure, the Preparatory Example 1 aliphatic polyimide precursor solution was replaced with 1.33 grams of the Comparative Preparatory Example 1 aromatic polyimide precursor solution to form a negative electrode containing an aromatic polyimide binder and used to form a lithium coin cell identified as Comparative Example 2.

Figure 1:
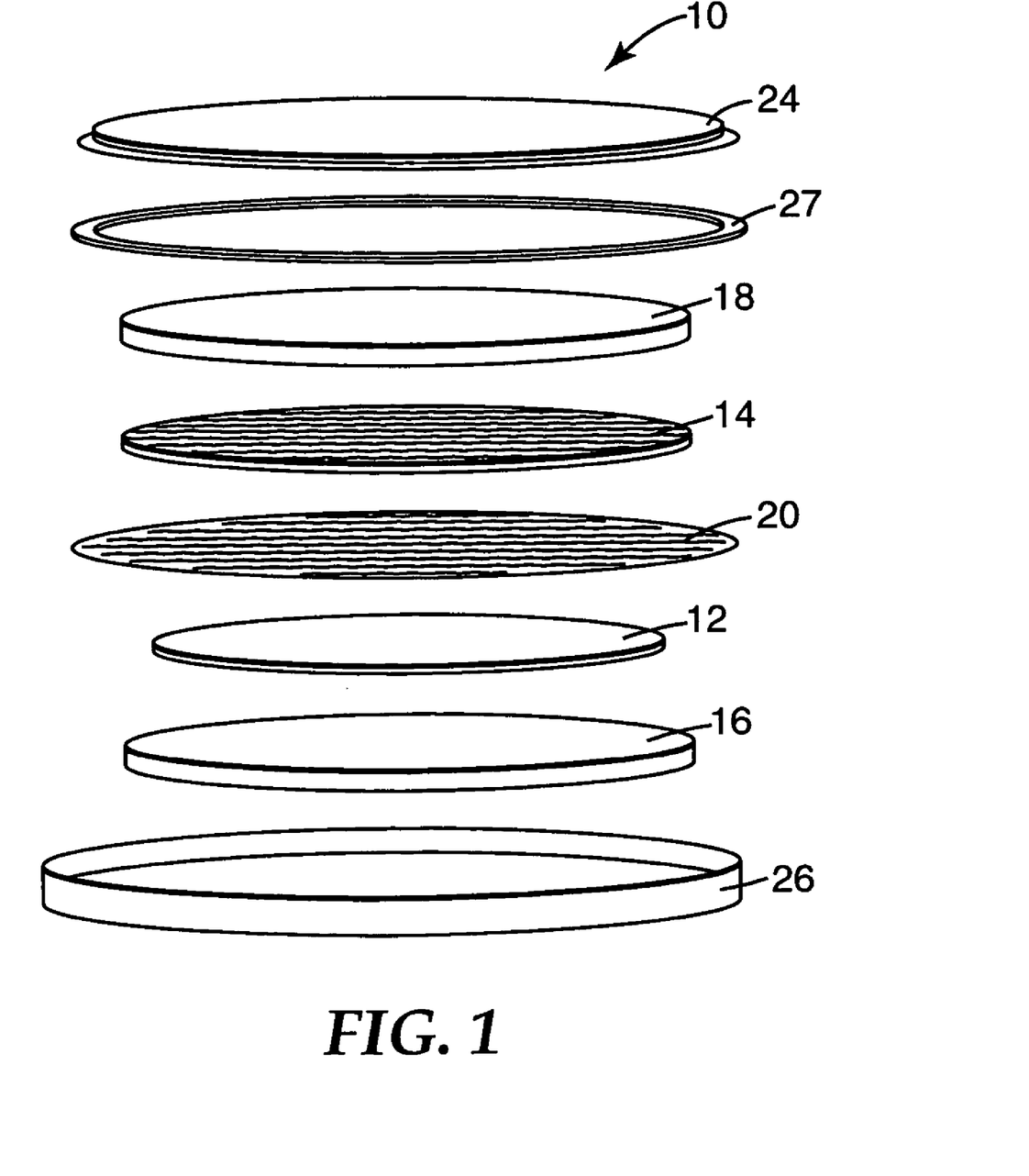
FIG. 1 is an exploded perspective schematic view of an electrochemical cell.

Coin-type test cells were built in 2325 coin cell hardware as described in A. M. Wilson and J. R. Dahn, *J. Electrochem. Soc.*, 142, 326-332 (1995). An exploded perspective schematic view of a 2325 coin cell 10 is shown in FIG. 1. Stainless steel cap 24 and oxidation resistant case 26 contain the cell and serve as the negative and positive terminals respectively. The negative electrode 14 was formed on nickel foil current collector 18 as described above. The positive electrode 12 was formed from metallic lithium on a copper current collector 16. Separator 20 was formed from two layers of CELGARD™ 2400 microporous material (available from Celgard, Inc., Charlotte, N.C.), and wetted with an electrolyte prepared from 1 M $LiPF_6$ in a 1:2 (by volume) mixture of ethylene carbonate and diethyl carbonate. Gasket 27 provided a seal and separated the two terminals. A tightly squeezed stack was formed when the cell was crimped closed. The assembled cells were cycled at room temperature using a MACCOR™ current cycler (available from Maccor, Inc., Tulsa, Okla.) operated at a constant current of 0.125 mA between 0.9V and 0.025V for the first cycle, and at a constant current of 0.5 mA between 0.9V and either 0.050V or 0.005V for all additional cycles. The % irreversible capacity loss during the first cycle was measured and is reported in Table II below along with the irreversible capacity loss per gram of electrode material (minus the weight of the current collector:

TABLE II

| Example No. or Comparative Example No. | Polyimide Precursor Solution | BTDA: BuTDA Molar Ratio | % Irreversible Capacity Loss (1st Cycle) | Irreversible Capacity Loss, mAh/g Electrode |
|---|---|---|---|---|
| Example 8 | Preparatory Example 1 | 0:100 | 19.4 | 155 |
| Example 9 | Preparatory Example 3 | 50:50 | 25.6 | 205 |
| Example 10 | Preparatory Example 4 | 75:25 | 22 | 182 |
| Example 11 | Preparatory Example 5 | 90:10 | 20 | 163 |
| Example 12 | Preparatory Example 6 | 95:5 | 19.7 | 158 |
| Comparative Example 2 | Comparative Preparatory Example 1 | 100:0 | 34 | 285 |

As shown above by the Comparative Example 2 cell test results, a cell whose negative electrode employed an aromatic polyimide binder suffered a high first cycle irreversible capacity loss. As shown above by the Example 8 cell test results, a cell whose negative electrode employed an aliphatic polyimide binder suffered a much less severe first cycle irreversible capacity loss. As shown above by the Example 9-12 test results, cells whose negative electrode employed an aromatic/aliphatic polyimide binder also suffered less severe first cycle irreversible capacity losses.

Figure 2:
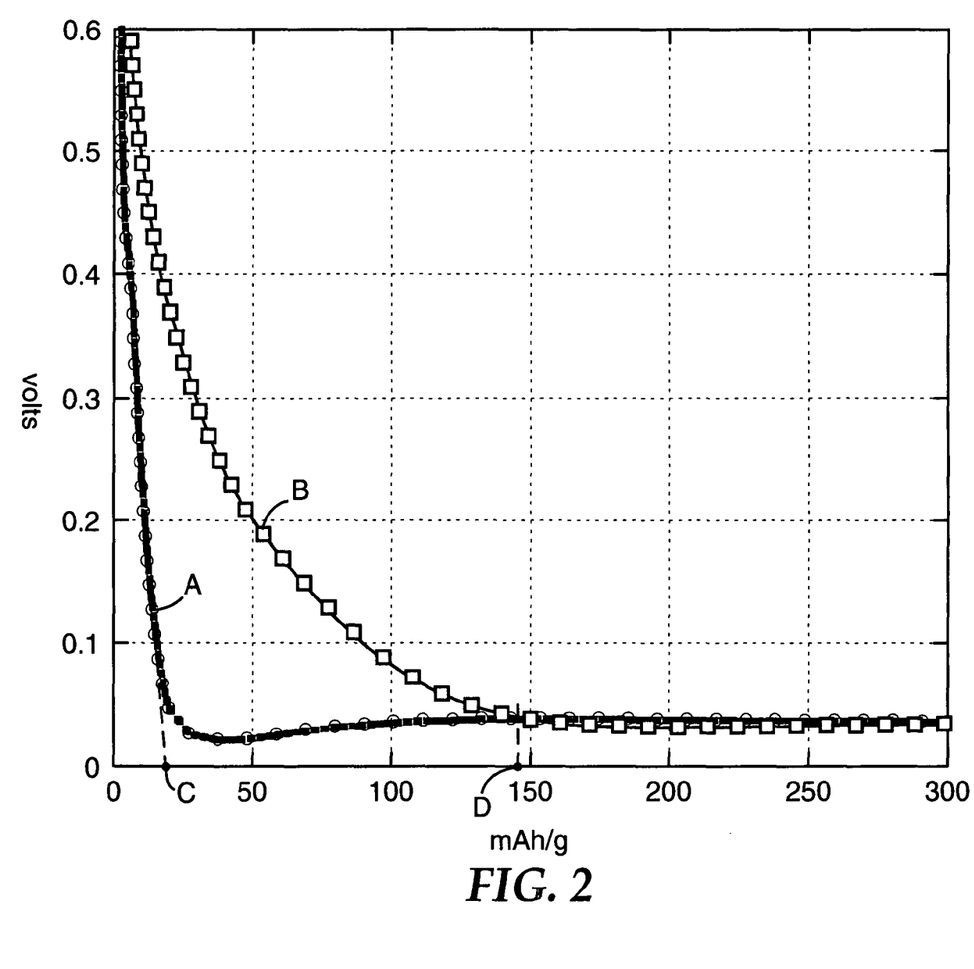
FIG. 2 is a first lithiation (discharge) curve for cells employing the polyimide binders of Example 8 and Comparative Example 2.

First lithiation (discharge) voltage curves were measured for the cells of Example 8 and Comparative Example 2. The curves are shown in FIG. 2. Curve A was obtained using the Example 8 cell and Curve B was obtained using the Comparative Example 2 cell. The Example 8 cell clearly shows extra irreversible capacity amounting to about 120 mAh/g as evidenced by the horizontal distance in FIG. 2 between point C (the x-axis intercept for the curve A initial slope shown as a dashed oblique line in FIG. 2) and point D (the x-axis value for the curve A/curve B intersection shown as a dashed vertical line in FIG. 2).

Examples 13-15 and Comparative Examples 3-4

Preparation of MCMB (Synthetic Graphite) Carbon Electrodes with Polyimide or Polyvinylidene Fluoride Binders Electrodes containing MCMB™ mesocarbon microbeads (available from MER Corporation, Tucson, Ariz.) were prepared and evaluated using the general method of Examples 8-12 and Comparative Example 2, with the following exceptions. In each instance, 1.7 grams mesocarbon microbeads were used in place of the $Si_{57}Al_{28}Fe_{15}$ alloy, the mesocarbon microbeads were mixed rather than milled with the binder, copper foil was used as the current collector and electrode curing was carried out at 120° C. in air. Additionally, Example 13 employed 1.33 grams of the Preparatory Example 1 composition as the polyimide precursor solution; Example 14 employed 1.33 grams of the Preparatory Example 2 composition as the polyimide precursor solution; Example 15 employed 1.33 grams of the Preparatory Example 4 solution as the polyimide precursor; Comparative Example 3 employed 1.33 grams PYRALIN™ PI2525 polyamic acid solution (a BTDA-based aromatic polyamic acid solution of benzophenone tetracarboxylic dianhydride/4,4-oxydianiline/m-phenylenediamine in NMP available from HD Microsystems, Wilmington, Del.) as the polyimide precursor solution; and Comparative Example 4 employed 1.33 grams KYNAR™ 461 polyvinylidene fluoride ("PVDF", available from Boedeker Plastics, Inc., Shiner, Tex.) in place of the polyimide precursor solution. The performance test results for cells employing the resulting electrodes are shown below in Table III.

TABLE III

| Example No. or Comparative Example No. | Binder Precursor Solution | BTDA: BuTDA Molar Ratio | % Irreversible Capacity Loss (1st Cycle) | Irreversible Capacity Loss, mAh/g Electrode |
| --- | --- | --- | --- | --- |
| Example 13 | Preparatory Example 1 | 0:100 | 13.5 | 39 |
| Example 14 | Preparatory Example 2 | 25:75 | 23 | 80 |
| Example 15 | Preparatory Example 4 | 75:25 | 15.4 | 55 |
| Comparative Example 3 | PYRALIN PI2525 Polyamic Acid | 100:0 | 37.5 | 173 |
| Comparative Example 4 | KYNAR 461 PVDF | Not Applicable | 13.6 | 36 |

As shown above in Table III, cells whose negative electrode employed an aromatic/aliphatic polyimide binder suffered less first cycle irreversible capacity loss than a cell whose negative electrode employed an aromatic polyimide binder. The irreversible capacity loss results for the Example 13 cell were similar to those obtained using PVDF as the binder, and offered other important advantages. For example, polyimide binders usually have higher density and better metal adhesion than PVDF, thus allowing fabrication of thinner electrodes having improved adhesion to metal foil current collectors. Example 13 was repeated using commercially-supplied BuTDA from TIC Americas, Inc. to prepare the polyimide precursor, resulting in a cell having a 12.6% first cycle irreversible capacity loss, or 45 m Ah/g of electrode.

Example 16

Cyclic Voltammetry

Figure 3:
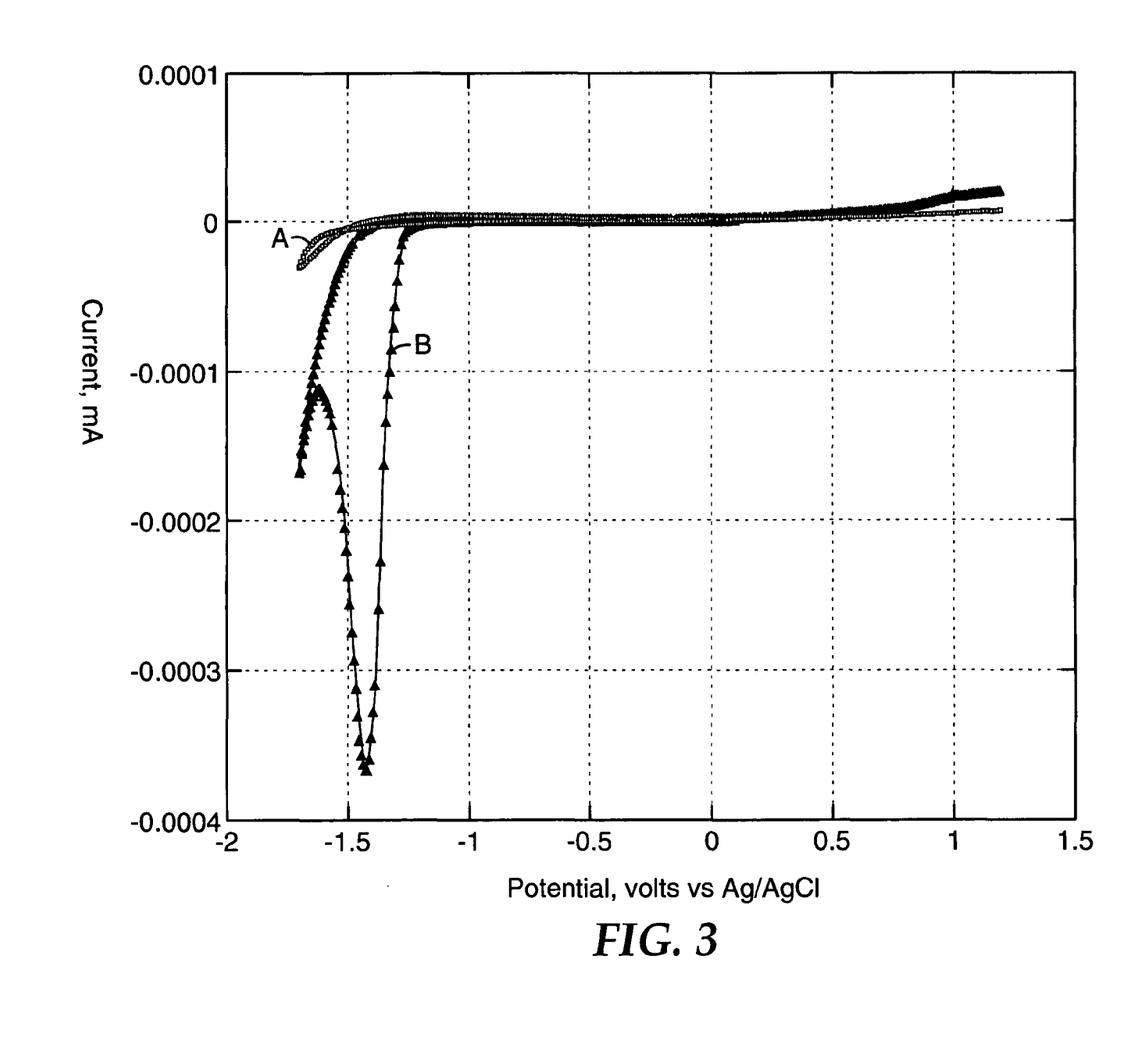
FIG. 3 is a cyclic voltammogram for polyimides prepared from Preparatory Example 1 and Comparative Preparatory Example 1.

The Preparatory Example 1 aliphatic polyimide precursor solution was diluted using NMP to form an approximately 2.5 wt. % solution. The solution was dip coated onto a titanium wire, dried at 80° C. for about 30 minutes and cured at 250° C. for 1 hour. A similar coated wire was prepared using the Comparative Preparatory Example 1 aromatic polyimide precursor solution. A cyclic voltammetry measurement was performed in a standard 3-electrode cell using a large (4 cm²) platinum flag as the counter electrode, an aqueous Ag/AgCl reference electrode 0.1M aqueous $NaClO_4$ electrolyte and a 5 mV/s sweep rate. The electrolyte was de-aerated using a nitrogen gas bubble for several minutes prior to applying the voltage sweep. The resulting cyclic voltammetry curves are shown in FIG. 3. Curve A was obtained using the aliphatic polyimide and Curve B was obtained using the aromatic polyimide. The aromatic polyimide clearly undergoes an irreversible electrochemical reduction (as evidenced by the current peak at about −1.6 volts in Curve B) whereas Curve A exhibits no current peak and no indication of electrochemical reduction.

A number of embodiments of the invention have been described. Nevertheless, it will be understood that various modifications may be made without departing from the spirit and scope of the invention. Accordingly, other embodiments are within the scope of the following claims.

We claim:
1. A secondary battery electrode composition comprising a powdered material capable of undergoing lithiation and delithiation and an aliphatic or cycloaliphatic polyimide binder, wherein the polyimide binder comprises repeating units of Formula I:

wherein
$R_1$ is aliphatic or cycloaliphatic and
$R_2$ is aromatic, aliphatic, cycloaliphatic, or a combination thereof,
wherein $R_1$ and $R_2$ contain only carbon, hydrogen, nitrogen or oxygen ring atoms.

2. A composition according to claim 1 wherein the powdered material comprises silicon, silver, lithium, tin, bismuth, lead, antimony, germanium, zinc, gold, platinum, palladium, arsenic, aluminum, gallium, indium, thallium or an alloy thereof.

3. A composition according to claim 1 wherein the powdered material comprises a silicon alloy.

4. A composition according to claim 1 wherein the powdered material comprises a lithium alloy.

5. A composition according to claim 1 wherein the powdered material comprises graphitic carbon.

6. A composition according to claim 1 wherein the polyimide binder has a plurality of imide groups bonded to aliphatic or cycloaliphatic moieties.

7. A composition according to claim 1 wherein the polyimide binder also comprises imide groups bonded to aromatic moieties.

8. A composition according to claim 7 wherein about 10 to about 90 mole percent of the imide groups are bonded to aliphatic or cycloaliphatic moieties and about 90 to about 10 mole percent of the imide groups are bonded to aromatic moieties.

9. A composition according to claim 7 wherein about 20 to about 80 mole percent of the imide groups are bonded to aliphatic or cycloaliphatic moieties and about 80 to about 20 mole percent of the imide groups are bonded to aromatic moieties.

10. A composition according to claim 7 wherein about 5 to about 95 mole percent of the imide groups are bonded to aliphatic or cycloaliphatic moieties and about 95 to about 5 mole percent of the imide groups are bonded to aromatic moieties.

11. A composition according to claim 1 wherein the polyimide has a majority of imide groups bonded to aliphatic or cycloaliphatic moieties.

12. A composition according to claim 1 wherein an $R_1$ or $R_2$ moiety is substituted with one or more groups that do not interfere with use of the polyimide in a lithium ion cell.

13. A composition according to claim 1 wherein an $R_1$ moiety is substituted with one or more electron-donating groups.

14. A composition according to claim 1 wherein $R_1$ is a tetrafunctional radical derivable from butane, cyclobutane, cyclopentane, cyclohexane, cyclohexene, bicyclooctane, bicyclooctene, bicycloheptane or bicyclooxetane.

15. A composition according to claim 1 wherein $R_2$ is a polyfunctional radical derivable from benzene, dibenzene, diphenyl ether, diphenylmethane, diphenylpropane, naphthalene, pyridine, pyrimidine, triazine, propane, butane, heptane, hexane, cyclohexane, heptane, octane, nonane, decane or dodecane.

16. A composition according to claim 1 wherein the polyimide can be prepared from 1,2,3,4-butanetetracarboxylic dianhydride.

17. A composition according to claim 1 wherein the polyimide can be prepared from 4,4'-oxydianiline.

18. A composition according to claim 1 wherein the polyimide can be prepared via a condensation reaction between an aliphatic or cycloaliphatic polyanhydride and an aromatic, aliphatic or cycloaliphatic polyamine to form a polyamic acid, followed by chemical or thermal cyclization to form the polyimide.

19. A composition according to claim 18 wherein the polyimide can be prepared via a condensation reaction additionally employing an aromatic polyanhydride.

20. A rechargeable lithium-ion cell comprising a negative electrode comprising a powdered material capable of undergoing lithiation and delithiation and an aliphatic or cycloaliphatic polyimide binder, a positive electrode, and an electrolyte comprising a lithium salt and a charge carrying medium, wherein the aliphatic or cycloaliphatic polyimide contains only carbon, hydrogen, nitrogen or oxygen ring atoms, wherein the polyimide binder comprises repeating units of Formula I:

wherein
$R_1$ is aliphatic or cycloaliphatic and
$R_2$ is aromatic, aliphatic, cycloaliphatic, or a combination thereof,
wherein $R_1$ and $R_2$ contain only carbon, hydrogen, nitrogen or oxygen ring atoms.

21. An electronic device comprising a rechargeable lithium-ion cell according to claim 20.

22. A battery pack comprising a rechargeable lithium-ion cell according to claim 20.

* * * * *

UNITED STATES PATENT AND TRADEMARK OFFICE
CERTIFICATE OF CORRECTION

| | | |
|---|---|---|
| PATENT NO. | : 7,972,725 B2 | Page 1 of 1 |
| APPLICATION NO. | : 11/218448 | |
| DATED | : July 5, 2011 | |
| INVENTOR(S) | : Larry J Krause | |

It is certified that error appears in the above-identified patent and that said Letters Patent is hereby corrected as shown below:

Column 1,
Line 33, delete "868" after "Takeuchi et al.".

Column 4,
Line 4, delete "U" and insert --A-- therefor.

Signed and Sealed this
Twenty-ninth Day of May, 2012

David J. Kappos
*Director of the United States Patent and Trademark Office*